United States Patent
Tanaka et al.

(10) Patent No.: US 8,924,134 B2
(45) Date of Patent: Dec. 30, 2014

(54) KNOCK CONTROL DEVICE OF INTERNAL COMBUSTION ENGINE

(75) Inventors: Toru Tanaka, Chiyoda-ku (JP); Yuhei Matsushima, Chiyoda-ku (JP); Keitaro Ezumi, Aki-gun (JP); Tomokuni Kusunoki, Aki-gun (JP); Atsushi Inoue, Aki-gun (JP); Hiroki Morimoto, Aki-gun (JP)

(73) Assignees: Mitsubishi Electric Corporation, Tokyo (JP); Mazda Motor Corporation, Hiroshima (JP)

( * ) Notice: Subject to any disclaimer, the term of this patent is extended or adjusted under 35 U.S.C. 154(b) by 323 days.

(21) Appl. No.: 13/611,743

(22) Filed: Sep. 12, 2012

(65) Prior Publication Data

US 2013/0218443 A1    Aug. 22, 2013

(30) Foreign Application Priority Data

Feb. 20, 2012    (JP) ................ 2012-033575

(51) Int. Cl.
*G06F 19/00*    (2011.01)
(52) U.S. Cl.
USPC ............. 701/111; 123/406.37; 73/35.01; 73/35.04; 73/35.09
(58) Field of Classification Search
CPC ......... G01L 23/00; G01L 23/221; F02P 5/152
USPC ........ 701/111; 123/406.37–406.39; 73/35.01, 73/35.03, 35.04, 35.09
See application file for complete search history.

(56) References Cited

U.S. PATENT DOCUMENTS

| | | | | |
|---|---|---|---|---|
| 5,287,837 | A * | 2/1994 | Hashimoto et al. | 123/406.29 |
| 6,591,660 | B1 * | 7/2003 | Franke et al. | 73/35.03 |
| 7,007,663 | B2 * | 3/2006 | Mashiki | 123/305 |
| 7,243,020 | B2 * | 7/2007 | Nakao et al. | 701/111 |
| 7,347,081 | B2 * | 3/2008 | Inoue et al. | 73/35.09 |
| 2004/0182360 | A1 * | 9/2004 | Mashiki | 123/305 |
| 2005/0241369 | A1 * | 11/2005 | Inoue et al. | 73/35.09 |
| 2013/0192343 | A1 * | 8/2013 | Tanaka et al. | 73/35.01 |

FOREIGN PATENT DOCUMENTS

| | | | |
|---|---|---|---|
| JP | 58-080539 | A | 5/1983 |
| JP | 58-104368 | A | 6/1983 |
| JP | 58-108434 | A | 6/1983 |
| JP | 2006-220115 | A | 8/2006 |

* cited by examiner

*Primary Examiner* — John Kwon
(74) *Attorney, Agent, or Firm* — Sughrue Mion, PLLC

(57) ABSTRACT

In a knock control device of an internal combustion engine equipped with a control unit which updates a background level based on an output signal from a knock sensor and detects the generation of a knock by comparing a variation of the background level with a knock determination value, a determination as to whether the knock is generated is performed by ((variation of first filter value of peak hold value)>
((1−filter coefficient)/(1+filter coefficient)×(predetermined value larger than maximum value of variation of peak hold value in case where knock is not generated))).

4 Claims, 12 Drawing Sheets

| ne | 500rpm | 1500rpm | 2500rpm | 3500rpm | 4500rpm |
|---|---|---|---|---|---|
| L | 1.0V | 1.2V | 1.4V | 1.6V | 1.8V |

KNOCK CONTROL DEVICE OF INTERNAL COMBUSTION ENGINE

BACKGROUND OF THE INVENTION

1. Field of the Invention

The present invention relates to a knock control device of an internal combustion engine equipped with a knock control unit which calculates a background level based on a detected knock signal of the internal combustion engine and performs knock determination by comparing a variation of background level with a knock determination value.

2. Description of the Related Art

An engine etc. that runs on gasoline ignites and burns air-fuel mixture in a cylinder by a spark from an ignition plug during combustion stroke; however, when pressure in the cylinder is abnormally increased in the middle of flame propagation after ignition, a knock in which an unburned portion of the air-fuel mixture is self-ignited may generate before the flame propagation is completed. Then, a problem exists in that, when the knock is generated, vibration which gives a sense of discomfort to occupants is generated and, in the worst case, the upper surface of a piston is melted and damaged to break down the engine.

Consequently, there has been conventionally proposed knock control in which, when the knock is generated, ignition timing of an ignition plug is retarded to eliminate the knock and optimum torque and fuel consumption are achieved.

In the knock control, a vibration detection sensor so-called a knock sensor is equipped on a cylinder block in order to detect the generation of the knock and a vibration waveform of the engine, which is detected by the knock sensor, is analyzed to determine the presence or absence of the generation of the knock.

More specifically, a predetermined crank angle range after ignition, in which a vibration waveform can be obtained if the knock is generated, is regarded as a knock determination period; and an output signal from the knock sensor is analog/digital (A/D) converted in the knock determination period and a peak value is regarded as a peak hold value in the knock determination period. Then, a background level is calculated by performing smoothing processing of the peak hold value. Furthermore, the background level is performed as much as predetermined times (for example, two times) to set a knock determination value.

Then, the knock determination value is compared to the peak hold value; and when the peak hold value exceeds the knock determination value, a determination is made that knocking is generated and elimination operation of the knock is performed, for example, the ignition timing of the ignition plug is retarded.

In Patent Document 1, an upper limit value of updating quantity is increased in response to an increase of a variation of fuel injection quantity per a certain period or a variation of a throttle position while stabilizing by setting the upper limit value to the updating quantity of the background level; and accordingly, the background level is converged to the peak hold value immediately.

This object is to provide countermeasures against a phenomenon in that, when a load of the engine is increased, the peak hold value is increased in also the case where the knock is not generated, but if stabilization is continued by smoothing processing or limitation processing of updating quantity, the background level is not immediately increased; and as a result, a knock determination value becomes excessively small and therefore the knock is erroneously determined.

On the other hand, the knock may generate when the load of the engine is increased; and a very strong knock may continuously generate in some cases. In the case of such a state (hereinafter, referred to as a "continuous knock generation state"), ignition timing needs to be immediately retarded to eliminate the knock.

In Patent Document 1, as shown in FIG. 1, the background level is made to follow immediately when the load is changed; and therefore, the knock determination value is also increased immediately. As a result, even in the case of the very strong knock signal, determination cannot be made as to whether or not the knock is generated. Then, separation from the continuous knock generation state described above cannot be made and therefore the knock is continuously generated to cause a serious effect on the engine.

Furthermore, in order to solve the above mention, there is a method which achieves a balance between following capability at the time when the load is changed and detection of the continuous knock generation state by appropriately adjusting an upper limit value of updating quantity to properly follow the background level as shown in FIG. 2. However, in the case where a load of the engine is gradually increased so that a change in the background level is below the upper limit value of updating quantity, the knock cannot be detected as shown in FIG. 3 and separation from the continuous knock generation state cannot be made.

That is, the method which forms the knock determination value based on the peak hold value and detects the knock by comparing with the peak hold value is effective at the time when the load is transited; however, the continuous knock generation state cannot be detected completely by only this method. Therefore, a knock detection method using the knock determination value which does not depend on the peak hold value is needed. If this method is referred to as a knock detection method during stationary time in comparison with the aforementioned method which depends on the peak hold value, the following Patent Document 2 to Patent Document 4 are conventionally proposed as knock detection techniques during such stationary time.

In Patent Document 2, an inclination of an envelope of a knock signal is detected by envelope detection to detect the knock using the difference between an inclination at the time when the knock is generated and an inclination other than that.

In Patent Document 3, a knock is detected by making it a condition that a knock signal is not lower than a reference value and an average inclination is not lower than a reference value.

In Patent Document 4, a knock is detected by regarding multiplication of a peak hold value by a coefficient as a knock determination value, the peak hold value being within a predetermined period at which a knock is not generated before ignition, and the coefficient being defined by engine speed and load.

PATENT DOCUMENT

[Patent Document 1] Japanese Examined Patent Publication No. 4312164
[Patent Document 2] Japanese Unexamined Patent Publication No. S58-80539
[Patent Document 3] Japanese Examined Patent Publication No. 1624678
[Patent Document 4] Japanese Unexamined Patent Publication No. S58-108434

As described above, the methods from Patent Document 2 to Patent Document 4 have been proposed as the knock detection method applicable during stationary time. However, each method is intended to a previous knock detection system; and therefore, the following problems are generated when applied to a knock detection system in which the background level is defined as a result of primary filter calculation of the knock signal, which is a specification in recent years.

In Patent Document 2, a technique in which the envelope detection is performed to detect the knock by the inclination of the envelope is proposed. However, an envelope detection circuit is newly needed in order that this technique is applied to the knock detection system in which the background level is defined as the result of the primary filter calculation of the knock signal, which is intended to be applied to the technique of the present application. Alternatively, processing equivalent to the envelope detection needs to be performed using software after A/D converting an output signal from a knock sensor. Thus, a problem exists in that costs of the detection circuit and CPU loads by software processing equivalent to the envelope detection are increased.

In Patent Document 3, a technique which detects the knock by the average inclination and duration time is proposed; however, a specific setting method of these determination values is not disclosed. For this reason, a method of setting a constant, which detects the continuous knock generation state and does not detect a single knock etc. other than the continuous knock generation state, is unclear. Furthermore, a problem exists in that the average inclination and the duration time need to be calculated using software; and therefore, CPU loads are increased.

In Patent Document 4, the knock determination value that is the multiplication of the peak hold value by the coefficient is set so that the coefficient is a minimum value of the peak hold values at the time when the knock is actually generated. That is, the minimum value of the peak hold values at the time when the knock is actually generated is the knock determination value. However, the measurement of such values by the actual engine is difficult because it is necessary to set the minimum value by measuring data while continuing a continuous strong knock state that is the continuous knock generation state and by measuring the same at various operation states and loads of the internal combustion engine in order to apply to the detection of the continuous knock generation state during stationary time. If such evaluation is performed, the engine is damaged, so that a problem of reliability arises in that, as for data obtained during progressive damage, it is impossible to tell where reliable data ends from the beginning of the measurement. Further, a damaged engine is repaired and evaluation is made by a plurality of engines; and accordingly, there arises a problem in costs.

BRIEF SUMMARY OF THE INVENTION

The present invention has been made to solve the problems of the related art as described above, and an object of the present invention is to provide a knock control device of an internal combustion engine in which new data for applying the present invention does not need to be obtained, setting man-hours are not increased, the amount of processing to be added is small, and CPU loads are not also increased, whereby low costs and correct knock detection can be achieved.

According to the present invention, there is provided a knock control device of an internal combustion engine, including: a knock sensor which sends an a vibration waveform signal based on the vibration of the internal combustion engine; and a control unit which updates a background level based on an output signal from the knock sensor, and detects the generation of a knock by comparing a variation of the background level with a knock determination value. In the control unit, the background level is calculated by primary filter calculation of the output signal from the knock sensor, and when the background level is expressed in ((current background level)=(filter coefficient)×(previous background level)+(1−filter coefficient)×(output signal from knock sensor)), ((1−filter coefficient)/(1+filter coefficient)×(value not lower than maximum value of variation of output signal from knock sensor in case where knock is not generated))

is regarded as the knock determination value.

According to a knock control device of a internal combustion engine of the present invention, a maximum value L of the variation of the output signal from the knock sensor is set from data in the case where a knock is not generated, whereby, setting can be made from data measured at the time when adapted to usual knock, the data being a variation of a peak hold value in the case where the knock is not generated. Therefore, new data for applying the present invention does not need to be obtained and setting man-hours are not increased.

Furthermore, measurement is made in an operation state of an internal combustion engine in which a knock is not generated; and therefore, problems in which an internal combustion engine is damaged and the credibility of data is unclear are not generated.

Further, there can be obtained a knock control device of an internal combustion engine in which the amount of processing to be added is small, CPU loads are not also increased, and a circuit such as an envelope detection circuit does not need to be added, whereby low costs and correct knock detection can be achieved.

The foregoing and other object, features, and advantages of the present invention will become more apparent from the following detailed description of embodiments and description shown in the accompanying drawings.

DETAILED DESCRIPTION OF THE INVENTION

Embodiment 1

Figure 1:
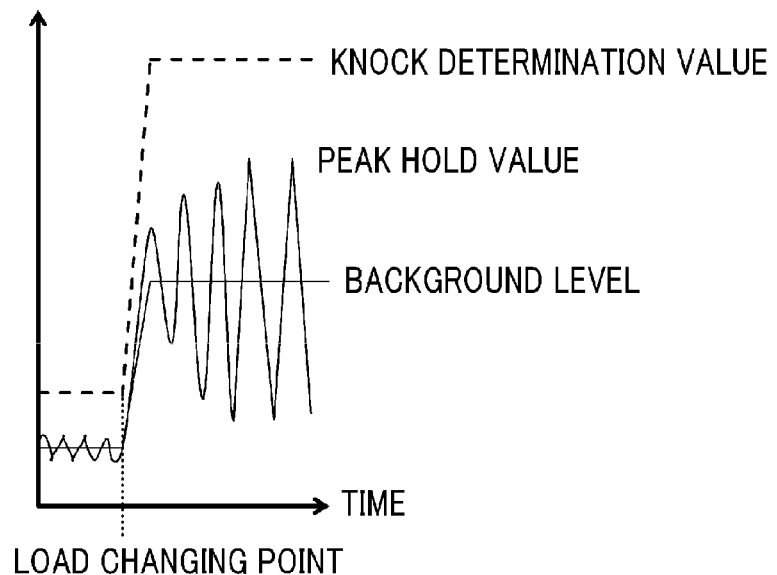
FIG. 1 is a timing chart for explaining knock detection and is a view showing an example in the case where a continuous knock generation state cannot be determined as to whether or not a knock is generated.
Figure 2:
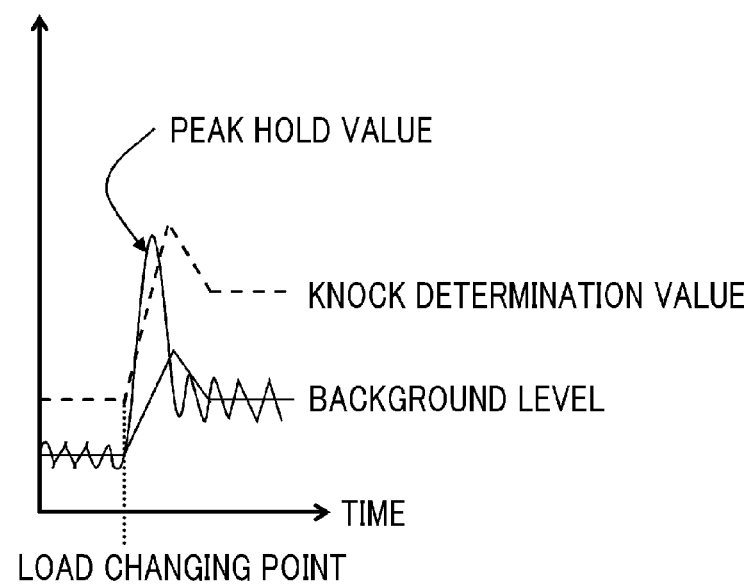
FIG. 2 is a timing chart for explaining knock detection and is a view showing an example in the case where a continuous knock generation state is determined that a knock is generated.
Figure 3:
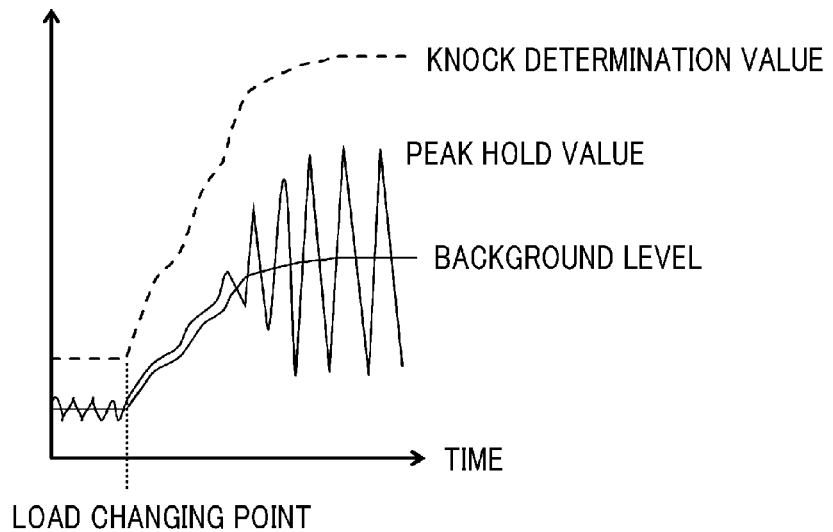
FIG. 3 is a timing chart for explaining knock detection and is a view showing an example in the case where a continuous knock generation state cannot be determined as to whether or not a knock is generated.

The basic concept of the present invention will be described first and then a knock control device of an internal combustion engine according to Embodiment 1 of the present invention will be specifically described in detail with reference to drawings.

In the knock control device of the present invention, a background level is defined as a result of primary filter calculation of an output signal from a knock sensor; and therefore, the background level is defined in the following Equation (1):

$$VBGL(n) = K \times VBGL(n-1) + (1-K) \times VP(n) \qquad \text{Equation (1)}$$

where
VBGL(n): background level,
VP(n): peak hold value,
K: filter coefficient, and
n: processing timing (discrete time).

Incidentally, hereinafter, description will be made that the output signal from the knock sensor is regarded as a peak hold value from the knock sensor; however, the peak hold value of the output signal of the knock sensor may be even an integral value (the area of the higher potential side than the center of vibration) of the output signal of the knock sensor. What matters is that the peak hold value may be a value corresponding to the output signal of the knock sensor and may be a signal in which the knock control device intended to be applied to the present invention defines. Furthermore, the filter coefficient K may be a constant, a value that depends on the internal combustion engine speed, or the like, which may be the filter coefficient Kin which the knock control device intended to be applied to the present invention defines.

At this time, data of peak hold values at the time when the knock is not generated in various operation states and loads of the internal combustion engine are measured and the maximum value L of variation thereof is obtained. Then, a variation of background level $\Delta VBGL(n)$ is defined in the following Equation (1-1):

$$\Delta VBGL(n) = VBGL(n) - VBGL(n-1) \qquad \text{Equation (1-1)}.$$

A knock determination value VTH is defined in the following Equation (1-2):

$$VTH = (1-K)/(1+K) \times L \qquad \text{Equation (1-2)}.$$

Furthermore, a knock intensity VK(n) is defined in the following Equation (1-3):

$$VK(n) = \Delta VBGL(n) - VTH \qquad \text{Equation (1-3)}.$$

If the knock intensity VK(n) is larger than zero (VK(n)>0), a determination is made that the knock is generated; and if other than that (VK(n)≤0), a determination is made that the knock is not generated.

In this case, if Equation (1) is applied to a definition of the variation of background level $\Delta VBGL(n)$ of the above-mentioned Equation (1-1)

$$\Delta VBGL(n) = VBGL(n) - VBGL(n-1),$$

the variation of background level $\Delta VBGL(n)$ is expressed in the following equation:

$$\Delta VBGL(n) = K(n) \times VBGL(n-1) + (1-K(n)) \times VP(n) - K(n-1) \times VBGL(n-2) - (1-K(n-1)) \times VP(n-1).$$

Incidentally, the filter coefficient K is defined to be intended to be applied to the present invention; and therefore, the filter coefficient K may depend on processing timing and is expressed as K(n).

Even if the filter coefficient K(n) is set depending on the operation states and loads of the internal combustion engine, a stationary state is studied in the present invention; and therefore, the filter coefficient K(n) is assumed as follows:

$$K(n) = K(n-1).$$

Furthermore, a processing timing of K(n) is only n; and therefore, K(n) is expressed as K.

Then, the above equation is expressed in the following equation:

$$\Delta VBGL(n) = K \times \Delta VBGL(n-1) + (1-K) \times \Delta \Delta VP(n)$$

where $$\Delta VP(n) = VP(n) - VP(n-1).$$

Figure 4:
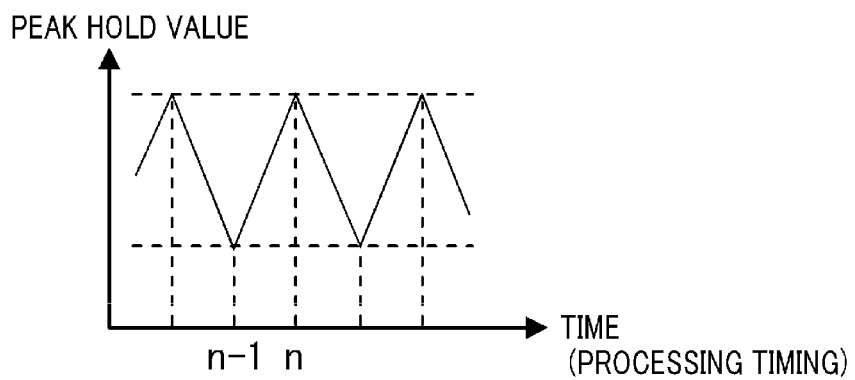
FIG. 4 is a timing chart for explaining knock detection and is a view showing the case where a variation of a peak hold value is the largest.

In this case, with regard to the fluctuation in peak hold values, in the case where change speed thereof is the fastest, that is, if considering the case of two processing timings in fluctuation period as shown in FIG. 4, a relation is established as follows:

$$\Delta VBGL(n) = -\Delta VBGL(n-1);$$

and therefore, the above-mentioned equation is expressed in the following equation:

$$\Delta VBGL(n) = (1-K)/(1+K) \times \Delta VP(n) \qquad \text{Equation (2)}.$$

In this case, if the maximum value of the variation of the peak hold value $\Delta VP(n)$ in the case where the knock is not generated is set as L in place of $\Delta VP(n)$, the following Equation (2-1) is established in each processing timing n in the case where the knock is not generated:

$$\Delta VBGL(n) \leq (1-K)/(1+K) \times L \qquad \text{Equation (2-1)},$$

that is, $((1-K)/(1+K)\times L)$ is the maximum value of the variation of background level in the case where the knock is not generated.

Figure 5:
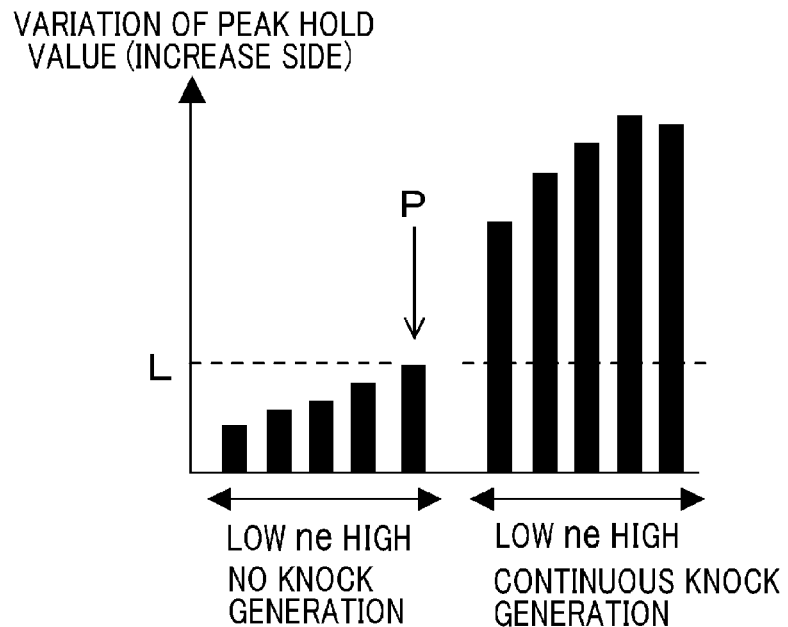
FIG. 5 is a view showing an adaptation method of a maximum value L of a variation of a peak hold value according to Embodiment 1 of the present invention.

In this case, in a method of setting L, as described above, data of the variation of the peak hold values in various operation states and loads of the internal combustion engine in the case where the knock is not generated are obtained and the maximum value thereof is set as L, which will be specifically described using FIG. 5.

FIG. 5 is a typical view in which maximum values of the peak hold values are graphically shown in the following cases: one is the case where the knock is not generated and the other is in the case of the continuous knock generation state, both cases being extracted from the measured results of the variation (only the increase side, that is, the plus side is shown) of the peak hold values in various operation states and loads of the internal combustion engine, and both cases are further classified by the engine speed ne of the internal combustion engine, respectively.

The maximum value L of the variation of the peak hold values is the maximum value of the variation of the peak hold values in the case where the knock is not generated; and therefore, the maximum value is defined by the data of P shown in FIG. 5. That is, if the knock is not generated in all the operation states and loads, the variation of the peak hold values are always not higher than L.

Consequently, if the maximum value L of the variation of the peak hold value is set in place of VP(n) in Equation (2), $((1-K)/(1+K)\times L)$ is obtained as the maximum value of the variation of background level $\Delta VBGL(n)$ in the case where the knock is not generated.

From the above, if $((1-K)/(1+K)\times L)$ is set as a determination value with respect to the variation of background level $\Delta VBGL(n)$, the determination value is always larger than the variation of background level $\Delta VBGL(n)$; and therefore, a determination is not made that the knock is generated. In contrast, if the variation of background level $\Delta VBGL(n)$ is larger than the determination value, a determination can be made that the knock is generated.

On the other hand, when the knock is generated, $\Delta VBGL(n)$ is not necessarily larger than the determination value $((1-K)/(1+K)\times L)$. However, from the method of setting L, $\Delta VBGL(n)$ is larger than the determination value at a certain timing when the knock is generated; and accordingly, it can be expected that the knock is generated. More particularly, in the continuous knock generation state, the variation of the peak hold values is large; and therefore, $\Delta VBGL(n)$ is larger than the determination value and a determination can be made that the knock is generated.

Next, the knock control device of the internal combustion engine according to Embodiment 1 of the present invention in which the above basic concept is embodied will be described in detail with reference to drawings.

Figure 7:
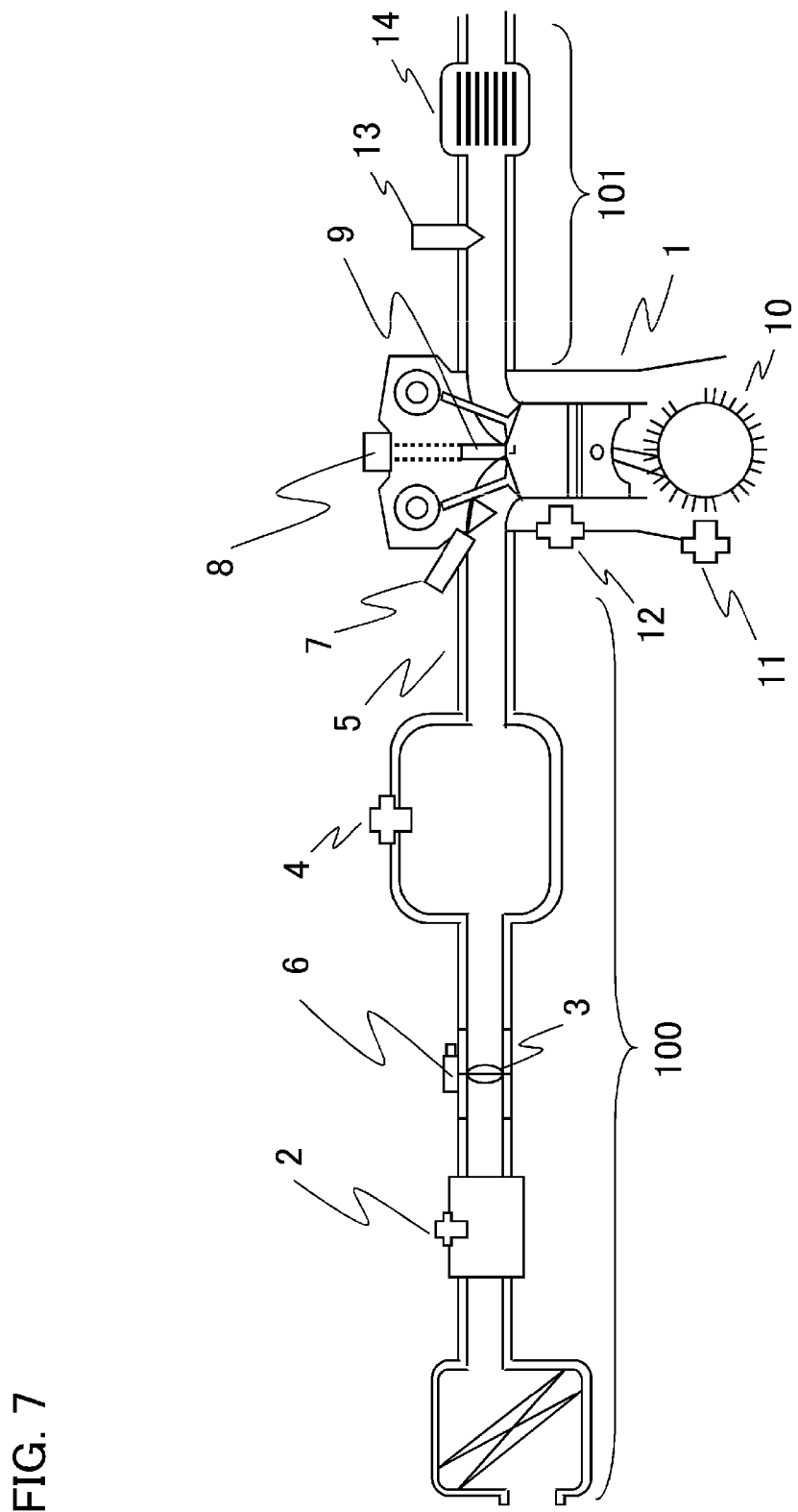
FIG. 7 is a configuration view schematically showing an internal combustion engine applying a knock control device of an internal combustion engine according to Embodiment 1 of the present invention.

FIG. 7 is a configuration view schematically showing the internal combustion engine applying the knock control device of the internal combustion engine according to Embodiment 1 of the present invention. Incidentally, an internal combustion engine for vehicles such as an automobile is usually equipped with a plurality of cylinders and pistons; however, for the sake of simplicity of the description, FIG. 7 shows only one cylinder and piston.

In FIG. 7, an intake system 100 of an internal combustion engine 1 includes an air flow sensor 2 which measures intake air flow volume from the upper stream side and sends an intake air flow volume signal corresponding to a measured value of the intake air flow volume, an electronically controlled throttle valve 3 whose position is electronically controlled to adjust intake air flow volume of the intake system 100, and an intake manifold pressure sensor 4 which is provided on a surge tank; and the intake system 100 is connected to a plurality of cylinders of the internal combustion engine 1 through an intake manifold 5.

A throttle position sensor 6 measures the position of the electronically controlled throttle valve 3 and sends a throttle valve position signal corresponding to a measured value of the position. Incidentally, a mechanical throttle valve directly connected with wire to an accelerator pedal (not shown in the drawing) may be used in place of the electronically controlled throttle valve 3.

The intake manifold pressure sensor 4 measures intake manifold pressure in the intake manifold 5 and sends an intake manifold pressure signal corresponding to a measured value of the intake manifold pressure. Incidentally, both of the air flow sensor 2 and the intake manifold pressure sensor 4 are provided in Embodiment 1; however, only either one of them may be provided.

An injector 7 which injects fuel is provided on an intake port of the intake manifold 5. Incidentally, the injector 7 may be provided so as to be able to directly inject into the cylinder of the internal combustion engine 1.

A cylinder head of the internal combustion engine 1 is provided with an ignition coil 8 which is for igniting air-fuel mixture in the cylinder and an ignition plug 9 connected to the ignition coil 8. Furthermore, a plate 10 provided with a plurality of edges placed at predetermined intervals on the peripheral surface thereof is located on a crankshaft of the internal combustion engine 1. A crank angle sensor 11 is located facing the edges of the plate 10, detects the edges of the plate 10 which rotates together with the crankshaft, and sends a pulse signal in synchronization with the placed intervals of the respective edges. A knock sensor 12 located on the internal combustion engine 1 sends a vibration waveform signal based on the vibration of the internal combustion engine 1.

An exhaust system 101 of the internal combustion engine 1 is provided with an oxygen concentration sensor 13 which measures oxygen concentration in exhaust gas and a catalyst device 14 which cleans up the exhaust gas.

Figure 8:
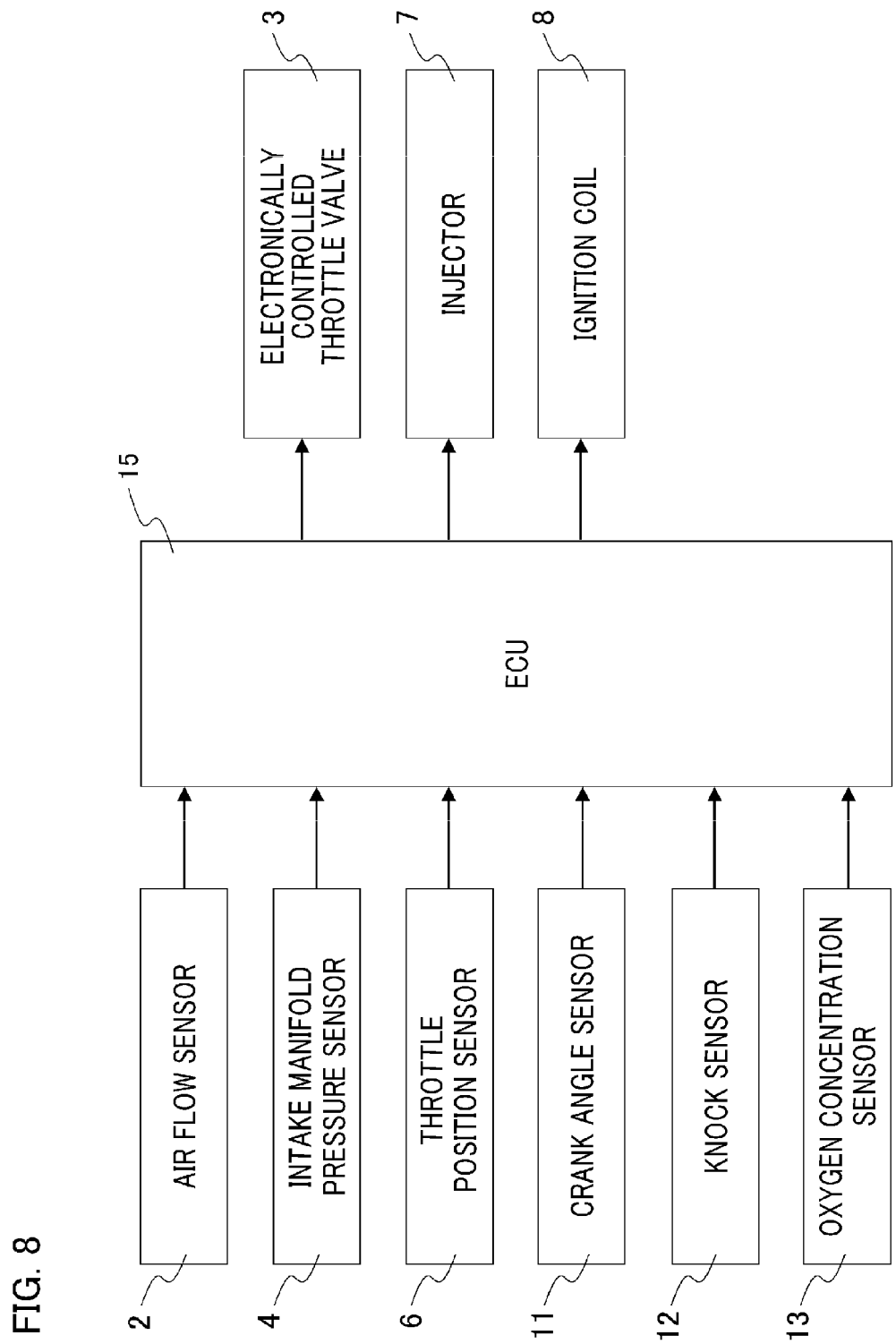
FIG. 8 is a block diagram showing the configuration of the knock control device of the internal combustion engine according to Embodiment 1 of the present invention.

FIG. 8 is a block diagram showing the configuration of the knock control device of the internal combustion engine according to Embodiment 1 of the present invention. In FIG. 8, an electronic control unit 15 (hereinafter, referred to as an "ECU") of the internal combustion engine 1 is configured by a calculation device such as a microcomputer and the following signals are applied thereto: the intake air flow volume signal sent from the air flow sensor 2; the intake manifold pressure signal sent from the intake manifold pressure sensor 4; the throttle valve position signal sent from the throttle position sensor 6; the pulse signal sent from the crank angle sensor 11 and synchronized with the placed intervals of the plate 10; the vibration waveform signal of the internal combustion engine 1 sent from the knock sensor 12; and an oxygen concentration signal in the exhaust gas, sent from the oxygen concentration sensor 13.

Furthermore, signals, which are other than the aforementioned respective signals and correspond to respective measured values, are applied to the ECU 15 from also other various sensors (not shown in the drawing). Further, for example, signals sent from other controllers such as an automatic transmission control system, a brake control system, and a traction control system, are also applied thereto.

The ECU 15 calculates a target throttle position based on an accelerator position (not shown in the drawing), an operation state of the internal combustion engine 1, and the like and controls the position of the electronically controlled throttle valve 3 based on the calculated target throttle position. Furthermore, the ECU 15 controls fuel injection quantity by driving the injector 7 so as to achieve a target air-fuel ratio depending on the operation state of the internal combustion engine 1. Further, the ECU 15 controls ignition timing by controlling energization to the ignition coil 8 so that target ignition timing is achieved.

In addition, the ECU 15 also controls to suppress the generation of a knock by setting the target ignition timing to the retard side as to be described later in the case where the knock of the internal combustion engine 1 is detected. Further, the ECU 15 calculates an indication value which is for controlling various types of actuators other than the before mention to control the various types of actuators based on the indication value.

Figure 9:
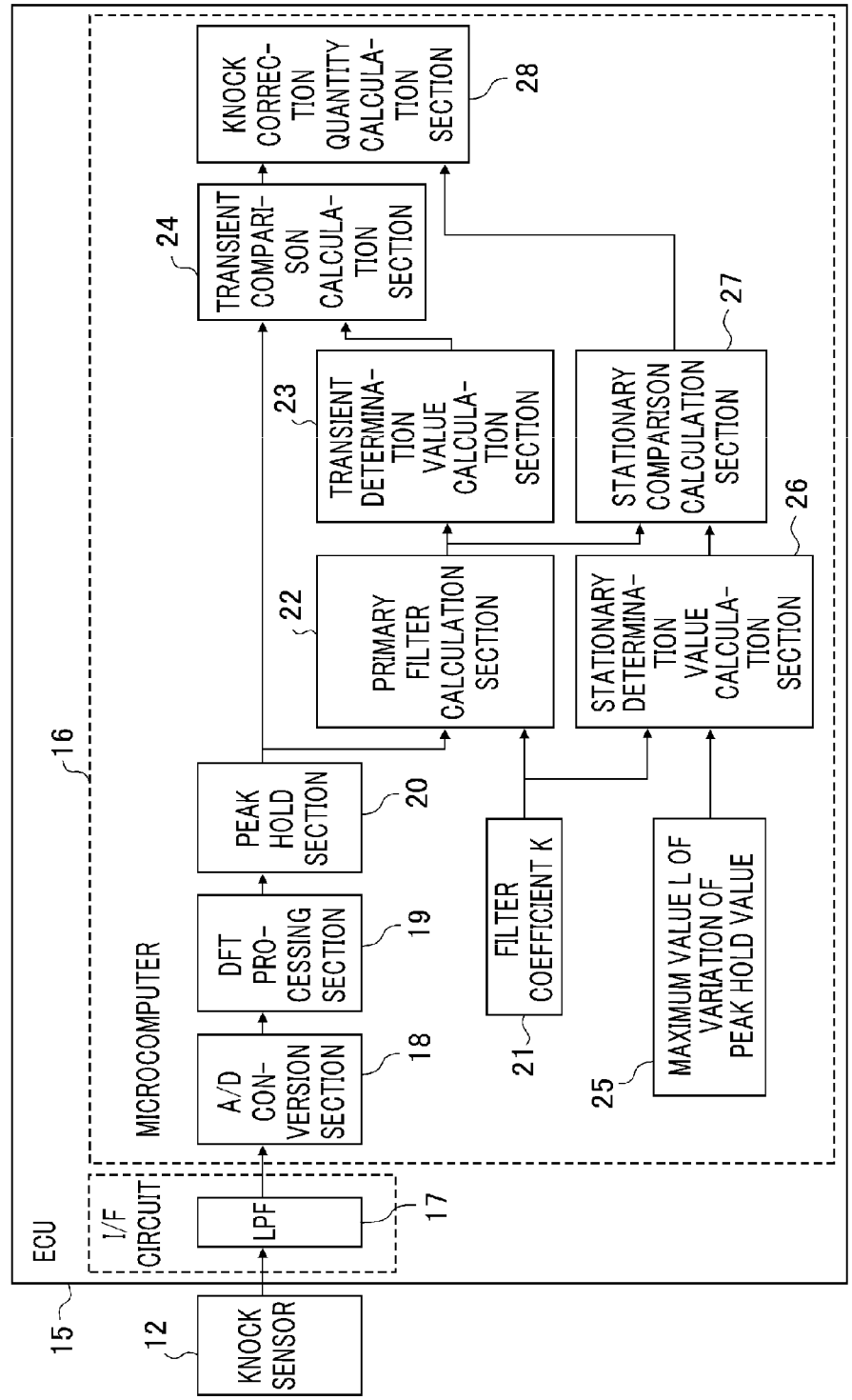
FIG. 9 is a block diagram showing the configuration of a knock control unit of the knock control device of the internal combustion engine according to Embodiment 1 of the present invention.

Next, the configuration and operation of a knock control unit configured in the ECU 15 will be described. FIG. 9 is a block diagram showing the configuration of the knock control unit in the knock control device of the internal combustion engine according to Embodiment 1 of the present invention. In FIG. 9, the knock control unit configured in the ECU 15 is composed of an interface (I/F) circuit and a microcomputer 16. The I/F circuit is configured by a low pass filter (hereinafter, referred to as a "LPF") 17 which receives the vibration waveform signal of the internal combustion engine 1, the vibration waveform signal being sent from the knock sensor 12, and removes a high frequency component from the vibration waveform signal.

The microcomputer 16 as a whole is composed of an analog/digital (A/D) converter which converts an analog signal to a digital signal, a read only memory (ROM) area which stores control programs and control constants, a random access memory (RAM) area which stores variables in the case of executing a program, and the like. The knock control unit includes an A/D conversion section 18, a discrete Fourier transform (DFT) processing section 19, a peak hold section 20, a filter coefficient K of a reference numeral 21, a primary filter calculation section 22, a transient determination value calculation section 23, a transient comparison calculation section 24, the maximum value L of a variation of a peak hold value of a reference numeral 25, a stationary determination value calculation section 26, a stationary comparison calculation section 27, and a knock correction quantity calculation section 28.

Among these, the maximum value L of the variation of the peak hold value of 25, the stationary determination value calculation section 26, and the stationary comparison calculation section 27 are new portions according to the present invention; the knock correction quantity calculation section 28 is a portion which makes a change to the control that is an application source of the present invention; and those other than these are portions of the control that is the application source of the present invention.

The LPF 17, as described before, receives the vibration waveform signal of the internal combustion engine 1, the signal being sent from the knock sensor 12, and removes the high frequency component from the vibration waveform signal. However, the entire vibration components are fetched by the A/D conversion section 18; and therefore, for example, the LPF 17 is configured that a bias of 2.5 V is applied to set the center of the vibration components to 2.5 V and thus the vibration components are fitted in a range of 0 V to 5 V centering on 2.5 V. Incidentally, the LPF 17 includes a gain conversion function which amplifies centering on 2.5 V in the case where the vibration component of the vibration waveform signal from the knock sensor 12 is small, and reduces centering on 2.5 V in the case where the vibration component is large.

The A/D conversion section 18 converts the vibration waveform signal to a digital signal, the vibration waveform signal being sent from the knock sensor and the vibration waveform signal's harmonic components being removed by the I/F circuit. A/D conversion by the A/D conversion section 18 is performed at regular time intervals, for example, at every 10 µs or 20 µs.

Incidentally, the A/D conversion section 18 always performs A/D conversion with respect to the analog signal from the LPF 17; and only data during a period at which a knock is generated in the internal combustion engine 1, for example, only data during a knock detection period set from top dead center (hereinafter, referred to as "TDC") of the piston to a crank angle (CA) of 50° (hereinafter, referred to as "50°CA") after top dead center (hereinafter, referred to as "ATDC") may be transferred to the DFT processing section 19. Alternatively, for example, A/D conversion is performed only during the knock detection period set from TDC to 50°CA ATDC and its data may be transferred to the DFT processing section 19.

The DFT processing section 19 performs time-frequency analysis for the digital signal from the A/D conversion section 18. More specifically, a spectrum row of a knock natural frequency component at each predetermined time is calculated by, for example, discrete Fourier transform (DFT) or short time Fourier transform (SIFT). Incidentally, as for digital signal processing by the DFT processing section 19, the knock natural frequency component may be extracted using an infinite impulse response (IIR) filter or a finite impulse response (FIR) filter.

The DFT processing section 19 starts processing after the completion of A/D conversion during the aforementioned knock detection period by the A/D conversion section 18 and terminates the processing until interrupt processing of crank angle synchronization which performs processing by the knock correction quantity calculation section 28 from the peak hold section 20 (to be described later), for example, until interrupt processing at a 75°CA before top dead center (hereinafter, referred to as "BTDC").

The peak hold section 20 calculates a peak hold value of the spectrum row calculated by the DFT processing section 19. The filter coefficient K of the reference numeral 21 sends the value of K to the primary filter calculation section 22 and the stationary determination value calculation section 26. The filter coefficient K, may be the filter coefficient K in which the knock control device intended to be applied to the present invention defines as described before. For example, the filter coefficient K may be 0.9 if a constant.

The primary filter calculation section 22 performs primary filter calculation with respect to the peak hold value calculated by the peak hold section 20 using the filter coefficient K of 21 in accordance with the aforementioned Equation (1). This value is regarded as the background level.

The transient determination value calculation section 23 calculates a transient knock determination value by Equation (3) represented as follows:

$$VTHt(n) = VBGL(n) \times Kth + Vofs \qquad \text{Equation (3)}$$

where

VTHt(n): transient knock determination value,
Kth: determination value coefficient, and
Vofs: determination value offset.

The determination value coefficient Kth and the determination value offset Vofs are previously adapted values so that the transient knock determination value VTHt (n) is larger than the peak hold value VP(n) when the knock is not generated and the transient knock determination value VTHt(n) is smaller than the peak hold value VP(n) when the knock is generated. These values may also be values in which the knock control device intended to be applied to the present invention defines. For example, the determination value coefficient Kth is two and the determination value offset Vofs is zero.

The transient comparison calculation section 24 compares the peak hold value VP(n) calculated by the peak hold section 20 with the transient knock determination value VTHt(n) calculated by the transient determination value calculation section 23 and calculates a transient knock intensity VKt(n) by Equation (4) represented as follows:

$$VKt(n)=V(n)-VTHt(n) \qquad \text{Equation (4)}$$

where

VKt (n): transient knock intensity.

The maximum value L of the variation of the peak hold value of 25 is a previously adapted predetermined value as described in FIG. 5 and is sent to the stationary determination value calculation section 26.

The stationary determination value calculation section 26 calculates a stationary knock determination value VTHs using the filter coefficient K of 21 and the maximum value L of the variation of the peak hold value of 25 by Equation (5) represented as follows:

$$VTHs=(1-K)/(1+K)\times L \qquad \text{Equation (5)}$$

where

VTHs: stationary knock determination value.

The stationary comparison calculation section 27 compares a variation of a background level VBGL(n) calculated by the primary filter calculation section 22 with the stationary knock determination value VTHs calculated by the stationary determination value calculation section 26 and calculates a stationary knock intensity VKs(n) by Equation (6) represented as follows:

$$VKs(n)=VBGL(n)-VBGL(n-1)-VTHs \qquad \text{Equation (6)}$$

where

VKs(n): stationary knock intensity.

The knock correction quantity calculation section 28 updates knock correction quantity θR(n) using the transient knock intensity VKt(n) calculated by the transient comparison calculation section 24 and the stationary knock intensity VKs(n) calculated by the stationary comparison calculation section 27.

More specifically, first, if the transient knock intensity VKt(n) is larger than zero (VKt(n)>0), a determination is made that a transient knock is generated and an updating quantity θchg is regarded as (−θrtd). If the transient knock intensity VKt(n) is equal to or lower than zero (VKt(n)≤0), a determination is made that the transient knock is not generated and the updating quantity θchg is regarded as θadv.

Next, if the stationary knock intensity VKs (n) is larger than zero (VKs(n)>0), a determination is made that a stationary knock is generated and the updating quantity θchg is regarded as (updating quantity θchg−θrtds). Then, the knock correction quantity θR(n) is updated by Equation (7) represented as follows:

$$\theta R(n)=\min(\max(\theta R(n-1)+\theta chg,\theta min),\theta max) \qquad \text{Equation (7)}$$

where

θR(n): knock correction quantity,

θchg: updating quantity,

θmin: lower limit value of knock correction quantity,

θmax: upper limit value of knock correction quantity, min (A, B): either smaller one of A and B is selected, and max (A, B): either larger one of A and B is selected.

θmin, θmax, θrtd, and θadv may be values in which the knock control device intended to be applied to the present invention defines. θrtds is a predetermined value in which retard quantity or the like necessary for eliminating the continuous knock generation state is previously obtained by adaptation, or a value defined depending on VKs(n) or the like. A setting is made to a relatively large value, for example, 3°CA to smoothly retard the ignition timing.

The microcomputer 16 in the ECU 15 calculates final ignition timing θIG (n) using the knock correction quantity θR(n) calculated as described before, by Equation (8) represented as follows:

$$\theta IG(n)=\theta B(n)+\theta R(n) \qquad \text{Equation (8)}$$

where

θIG(n): final ignition timing, and

θB(n): basic ignition timing.

The basic ignition timing θB(n) is also a predetermined value previously defined by adaptation and may be a value in which the knock detection device intended to be applied to the present invention defines. Incidentally, also with regard to all the knock correction quantity θR(n), the basic ignition timing θB(n), and the final ignition timing θIG(n), the advance side is positive and the retard side is negative.

The configuration of the knock control unit configured in the ECU 15 has been described. Next, the operation of the knock control unit will be shown using FIG. 10.

Figure 10:
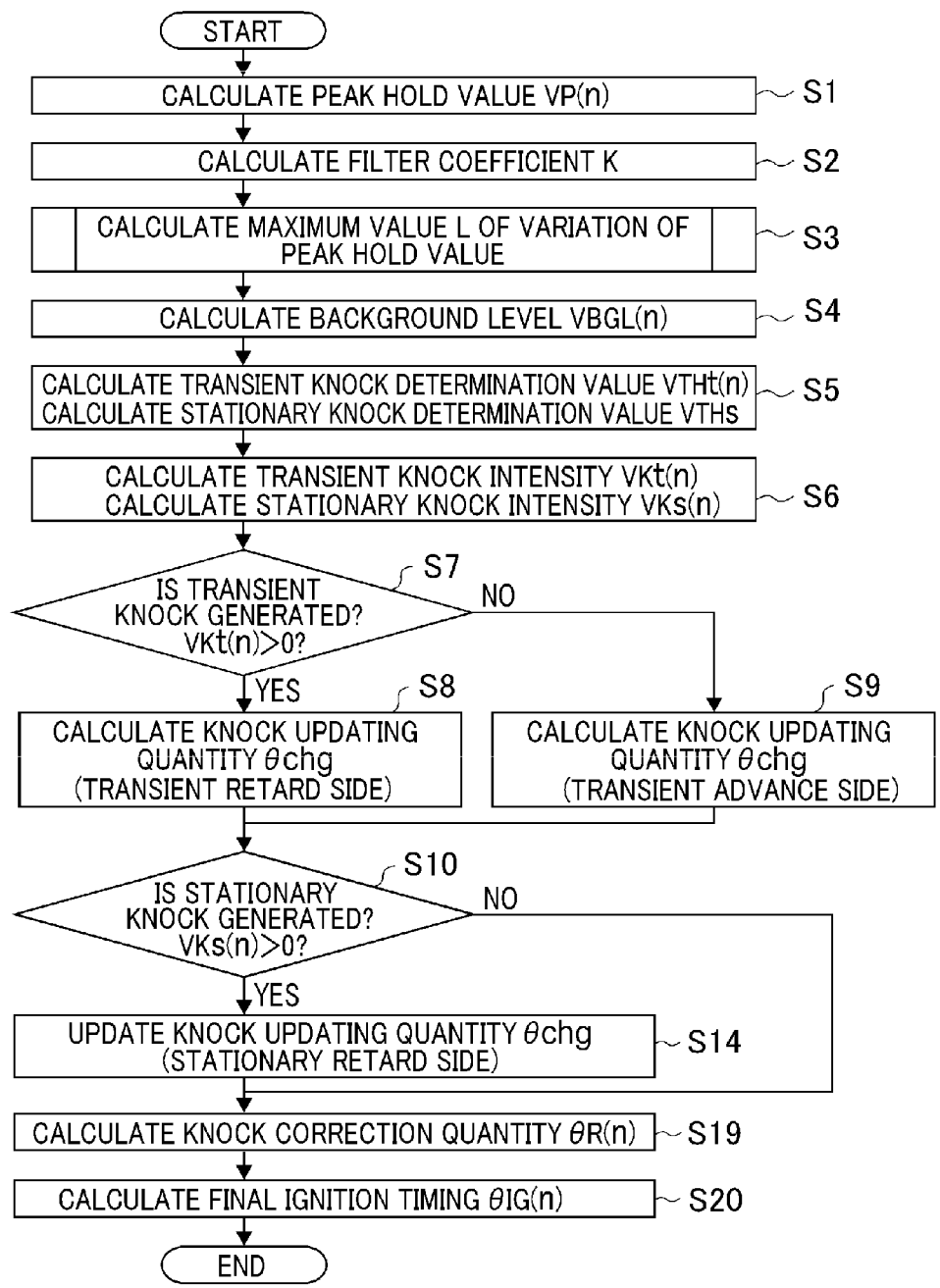
FIG. 10 is a flowchart of the knock control unit of the knock control device of the internal combustion engine according to Embodiment 1 of the present invention.

FIG. 10 is a flowchart of the knock control unit in the knock control device of the internal combustion engine according to Embodiment 1 of the present invention. Processing shown in FIG. 10 is performed by the interrupt processing of the crank angle synchronization, for example, by the interrupt processing at 75°CA BTDC, as described before.

The peak hold value VP(n) is calculated in step S1. The peak hold value VP(n) is a value in which the maximum value of the spectrum row calculated by the DFT processing section 19 is sent by the peak hold section 20 as described before.

The filter coefficient K is calculated in step S2. The filter coefficient K is a previously adapted constant, a value depending on the engine speed of the internal combustion engine, or the like.

The maximum value L of the variation of the peak hold value is calculated in step S3. In Embodiment 1, the maximum value L of the variation of the peak hold value is the previously adapted predetermined value as described in FIG. 5.

The background level VBGL(n) is calculated in step S4. The background level VBGL(n) is calculated by the aforementioned Equation (1) by the primary filter calculation section 22.

The transient knock determination value VTHt(n) and the stationary knock determination value VTHs are calculated in step S5. The transient knock determination value VTHt(n) is calculated by the aforementioned Equation (3) by the transient determination value calculation section 23. The stationary knock determination value VTHs is calculated by the aforementioned Equation (5) by the stationary determination value calculation section 26.

The transient knock intensity VKt(n) and the stationary knock intensity VKs(n) are calculated in step S6. The transient knock intensity VKt(n) is calculated by the aforementioned Equation (4) by the transient comparison calculation section 24. The stationary knock intensity VKs(n) is calculated by the aforementioned Equation (6) by the stationary comparison calculation section 27.

The transient knock intensity VKt(n) calculated by the aforementioned step S6 is compared to zero in step S7. The processing is advanced to step S8 when the transient knock intensity VKt(n) is larger than zero (VKt(n)>0) or advanced to step S9 when other than that (VKt(n)≤0). The processing from step S7 to step S19 is included in the knock correction quantity calculation section 28.

Step S8 is at the time when the transient knock is generated and therefore the updating quantity θchg is regarded as (−θrtd). Step S9 is at the time when the transient knock is not generated and therefore the updating quantity θchg is regarded as θadv.

The stationary knock intensity VKs(n) calculated by the aforementioned step S6 is compared to zero in step S10. The processing is advanced to step S14 when the stationary knock intensity VKs(n) is larger than zero (VKs(n)>0) or advanced to step S19 when other than that (VKs(n)≤0).

Step S14 is at the time when the stationary knock is generated and therefore the updating quantity θchg is regarded as (θchg−θrtds).

The knock correction quantity θR(n) is updated by the aforementioned Equation (7) so as to reflect the updating quantity θchg to θR(n) in step S19.

The final ignition timing θIG(n) is calculated in step S20. The final ignition timing θIG(n) is calculated by the aforementioned Equation (8). Then, ignition is performed according to θIG(n). That is, advanced and/or retarded ignition timing can be achieved depending on the knock determination result.

As described above, according to the knock control device of the internal combustion engine of Embodiment 1 of the present invention, the maximum value L of the variation of the output signal from the knock sensor is set from data in the case where the knock is not generated; and therefore, setting can be made from data measured at the time when adapted to usual knock, the data being the variation of the peak hold value in the case where the knock is not generated. Therefore, new data for applying the present invention does not need to be obtained and setting man-hours are not increased. Furthermore, measurement is made in an operation state of the internal combustion engine in which the knock is not generated; and therefore, problems in which the internal combustion engine is damaged and the credibility of data is unclear are not generated.

In addition, an advantage exists in that there can be obtained the knock control device of the internal combustion engine in which the amount of processing to be added is small, CPU loads are not also increased, and a circuit such as an envelope detection circuit does not need to be added; and therefore, low costs and correct knock detection can be achieved.

Embodiment 2

A knock control device of an internal combustion engine according to Embodiment 2 of the present invention will be described. The different point between Embodiment 2 and Embodiment 1 is only a method of calculating a maximum value L of a variation of a peak hold value; and therefore, only this portion will be described.

The maximum value L of the variation of the peak hold value is defined depending on the engine speed ne of the internal combustion engine. In the method of setting L, as in Embodiment 1, data of peak hold values in various operation states and loads of the internal combustion engine in which a knock is not generated are obtained and maximum values of the variation thereof are classified by the engine speed ne of the internal combustion engine to set as table data. This is L shown in FIG. 6 and, for example, is set as FIG. 11.

Figures 11, 12:
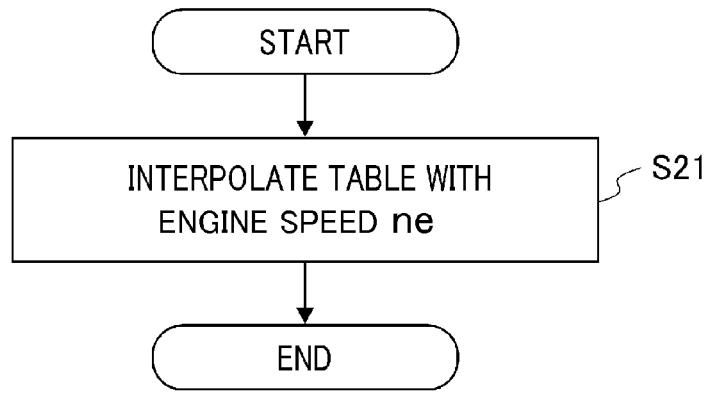
FIG. 11 is a view showing an example of an adaptation value which defines the maximum value L of the variation of the peak hold value according to Embodiment 2 of the present invention.
FIG. 12 is a flowchart of a step which calculates the maximum value L of the variation of the peak hold value according to Embodiment 2 of the present invention.

In the maximum value L of the variation of the peak hold value of 25 of FIG. 9, the table of FIG. 11 is interpolated with the engine speed ne; and its result is used as L of the above-mentioned Equation (5) in a stationary determination value calculation section 26.

The maximum value L of the variation of the peak hold value is calculated in step S3 of FIG. 10; however, in Embodiment 2, calculation is performed according to FIG. 12. FIG. 12 is a flowchart of a step which calculates the maximum value L of the variation of the peak hold value of a knock control unit in the knock control device of the internal combustion engine according to Embodiment 2 of the present invention.

After step S2 of FIG. 10, the processing is advanced to step S21 of FIG. 12. In step S21, the table of FIG. 11 is interpolated with the engine speed ne of the internal combustion engine to calculate the maximum value L of the variation of the peak hold value. Then, the processing is advanced to step S4 of FIG. 10; and, after that, calculation is performed as in Embodiment 1.

Figure 6:
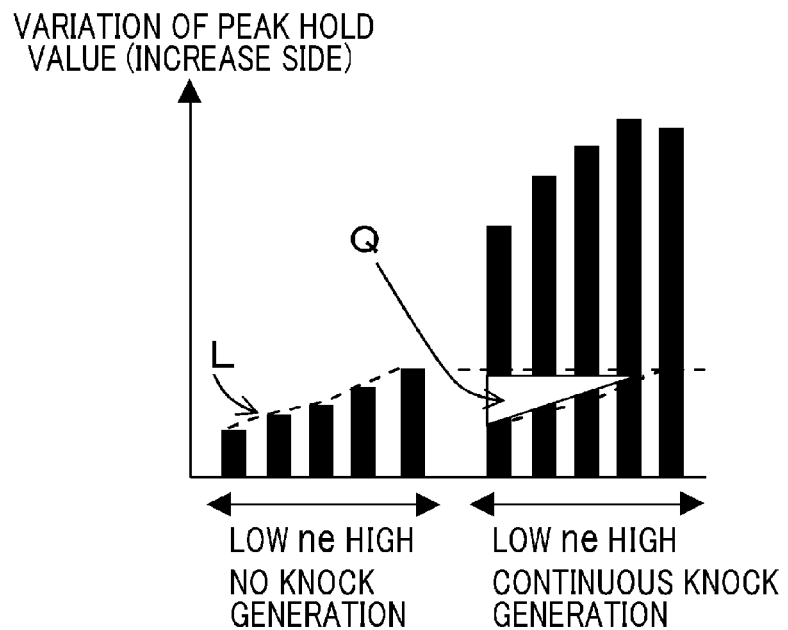
FIG. 6 is a view showing an adaptation method of a maximum value L of a variation of a peak hold value according to Embodiment 2 of the present invention.

FIG. 6 is the case where L shown in FIG. 5 is set depending on the engine speed ne of the internal combustion engine. In an area where the engine speed ne is low, L shown in FIG. 6 is smaller than L shown in FIG. 5 (a portion of Q shown in FIG. 6). For this reason, a value of the determination value ((1−K)/(1+K)×L) is also small and a variation of background level in a continuous knock generation state readily exceeds the determination value. That is, knock determination is more accurate.

As described above, according to Embodiment 2 of the present invention, the maximum value L of the variation of the peak hold value from a knock sensor in the case where the knock is not generated can be set depending on the engine speed of the internal combustion engine; and therefore, L can be set to be smaller depending on the engine speed. Therefore, the knock can be detected more reliably in the continuous knock generation state.

Embodiment 3

A knock control device of an internal combustion engine according to Embodiment 3 of the present invention will be described. The different points between Embodiment 3 and Embodiment 1 are a portion of a knock correction quantity calculation section 28 shown in FIG. 9 and a portion from step S10 that determines the presence or absence of the generation of a stationary knock to step S19 that calculates knock correction quantity θR(n) in FIG. 10; and therefore, only these portions will be described.

In the portion of the knock correction quantity calculation section 28 shown in FIG. 9 in Embodiment 3, the case where the number of repeating times, in which a determination that "stationary knock is generated" is held for a predetermined processing timing T1 when the stationary knock is generated and a determination that "next stationary knock is generated" is established within its hold time, becomes predetermined times T2, is regarded as the determination that "stationary knock is generated" in Embodiment 1. The knock correction quantity calculation section 28 includes a hold counter that counts the hold time and a generation counter that counts the number of repeating times.

Figure 13:
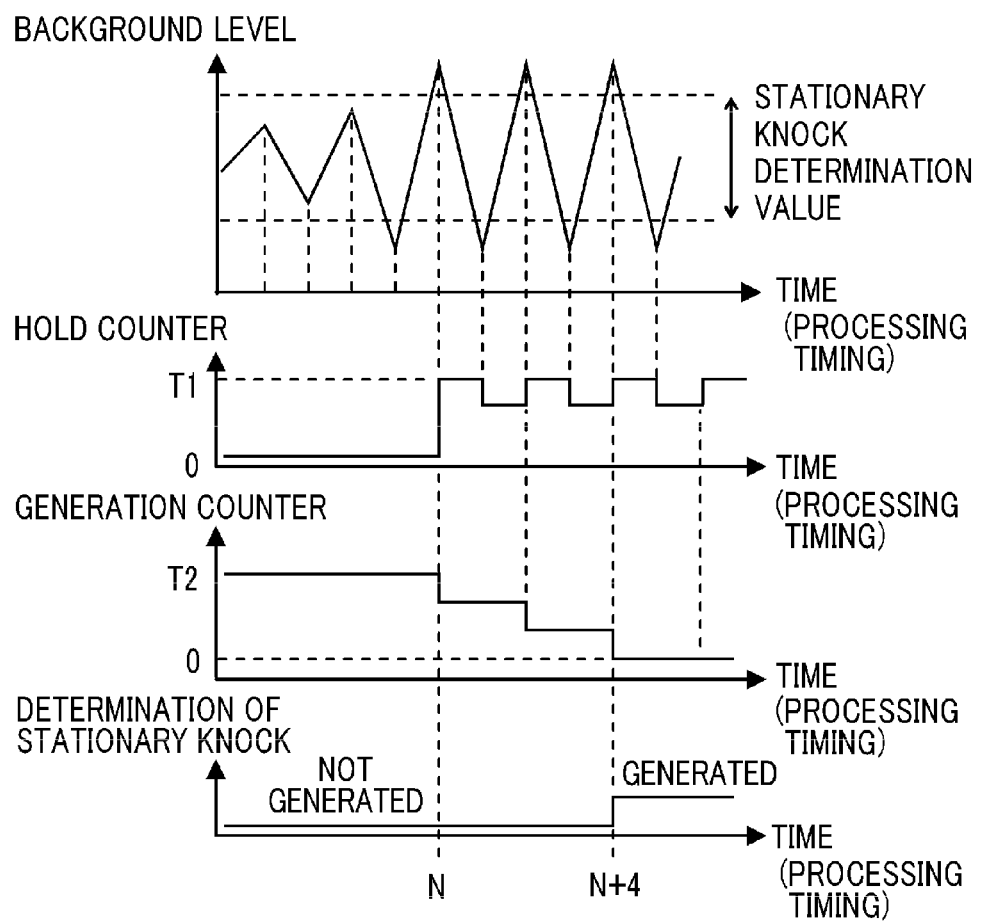
FIG. 13 is a timing chart for explaining the operation of determination of a stationary knock at the time when a knock is continuously generated according to Embodiment 3 of the present invention.

More specifically, description will be made using FIG. 13. FIG. 13 is a timing chart for explaining the operation of the determination of the stationary knock in the knock control device of the internal combustion engine according to Embodiment 3 of the present invention. Each operation of background level, the hold counter, the generation counter, and the determination of stationary knock is shown in a temporal sequence of processing timing. A timing at which a variation of background level exceeds a stationary knock determination value is regarded as a time of processing timing N. That is, it is a timing at which a relationship that a stationary knock intensity VKs(n) is larger than zero (VKs(n)>0) is established. Furthermore, T1 is three and T2 is three.

When VKs(n) is larger than zero (VKs(n)>0), the hold counter is set to T1; and when other than that (VKs(n)≤0), the hold counter is counted down. After the processing timing N, the background level exceeds the stationary knock determination value for every two processing timings; and therefore, the hold counter operates to repeat T1 and (T1−1) alternately.

When VKs(n) is larger than zero (VKs(n)>0), the generation counter is counted down; when the hold counter is zero, the generation counter is set to T2; and when other than that (VKs(n)≤0), the generation counter holds its value. After the processing timing N, the hold counter is larger than zero and the background level exceeds the stationary knock determination value for every two processing timings; and therefore, the generation counter is counted down for every two processing timings.

Since T1 is three and T2 is three, the generation counter is zero at the time of a processing timing of (N+4); and at this time, it is regarded as the determination that "stationary knock is generated" in Embodiment 1. Also, after that, the hold counter is larger than zero and the stationary knock intensity VKs(n) is larger than zero (VKs(n)>0); and therefore, "the generation counter is zero" is continued, that is, the determination that "stationary knock is generated" is also continued.

Figure 14:
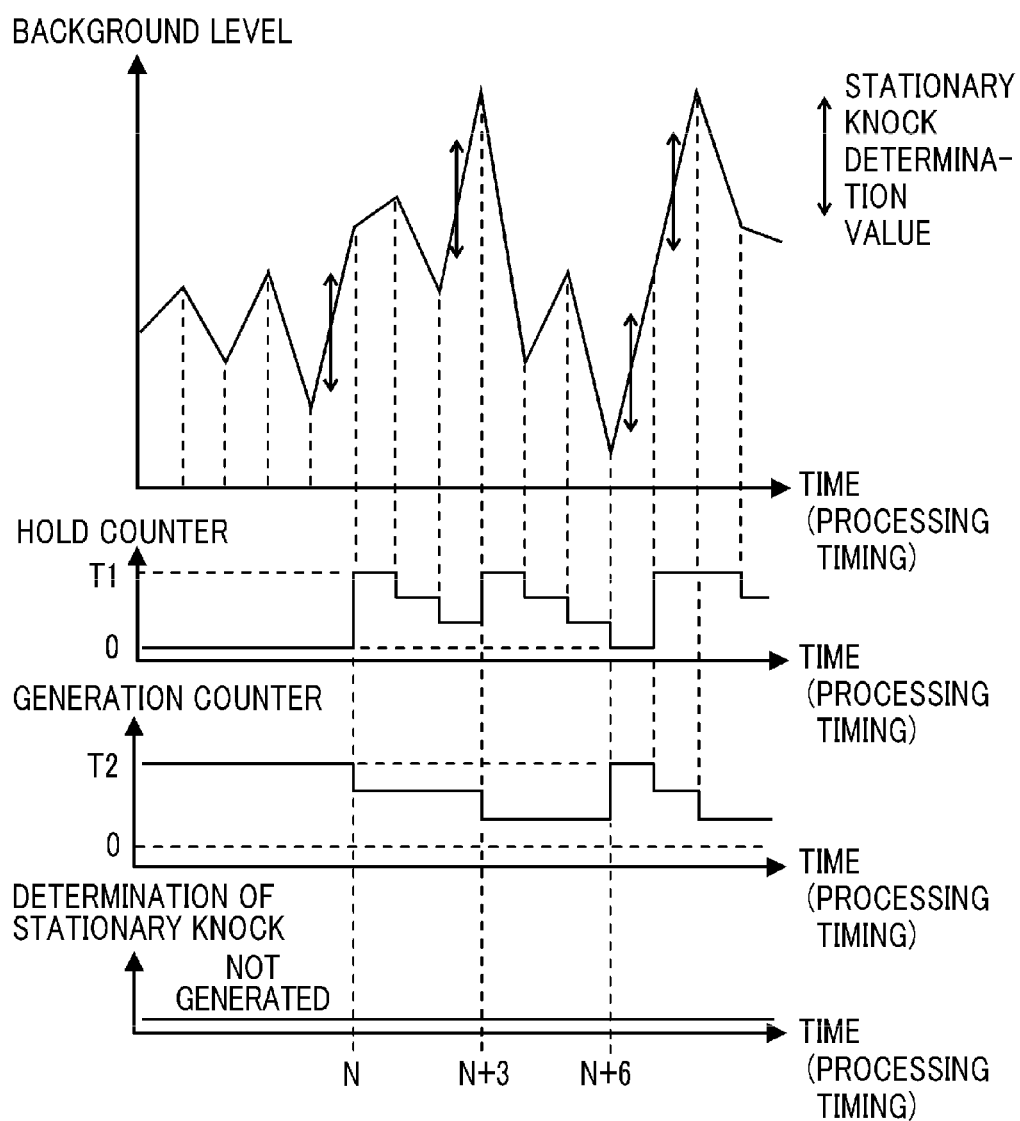
FIG. 14 is a timing chart for explaining the operation of determination of a stationary knock at the time when a knock is not continuously generated according to Embodiment 3 of the present invention.

On the other hand, FIG. 14 is a timing chart for explaining the operation of a determination of the stationary knock in the knock control device of the internal combustion engine according to Embodiment 3 of the present invention and is an example of the case where a relationship that the stationary knock intensity VKs(n) is larger than zero (VKs(n)>0) is not established within a period at which the hold counter is larger than zero. Terms and the like are the same as those shown in FIG. 13.

As in FIG. 13, a timing at which a variation of background level exceeds a stationary knock determination value is regarded as a time of processing timing N. At this time, the hold counter is T1 and the generation counter is (T2−1). At the point of (N+3), a relationship that VKs(n) is larger than zero (VKs(n)>0) is established again and a hold time is extended. However, after that, a relationship that the stationary knock intensity VKs(n) is equal to or lower than zero (VKs(n)≤0) is continued. Then, at the point of (N+6), the hold counter is zero; the generation counter is set to T2; and a determination of the stationary knock, the determination being started form the point N, is reattempted.

From the above-mentioned operation, a processing timing of (T1×(T2−1)) at the longest is needed from a first establishment of the relationship that the stationary knock intensity VKs(n) is larger than zero (VKs(n)>0) to an establishment of the determination of the stationary knock. Then, if the shortest time that has to eliminate a knock after the knock is generated in the continuous knock generation state in various operation states of the engine is known, the processing time of (T1×(T2−1)) has to be set shorter than that time. That is, if T1 and T2 are set as described above and if a knock is the knock to be detected by the determination of the stationary knock, the knock can be surely detected and eliminated until the time at which the knock has to be eliminated in various operation states of the engine.

Figure 15:
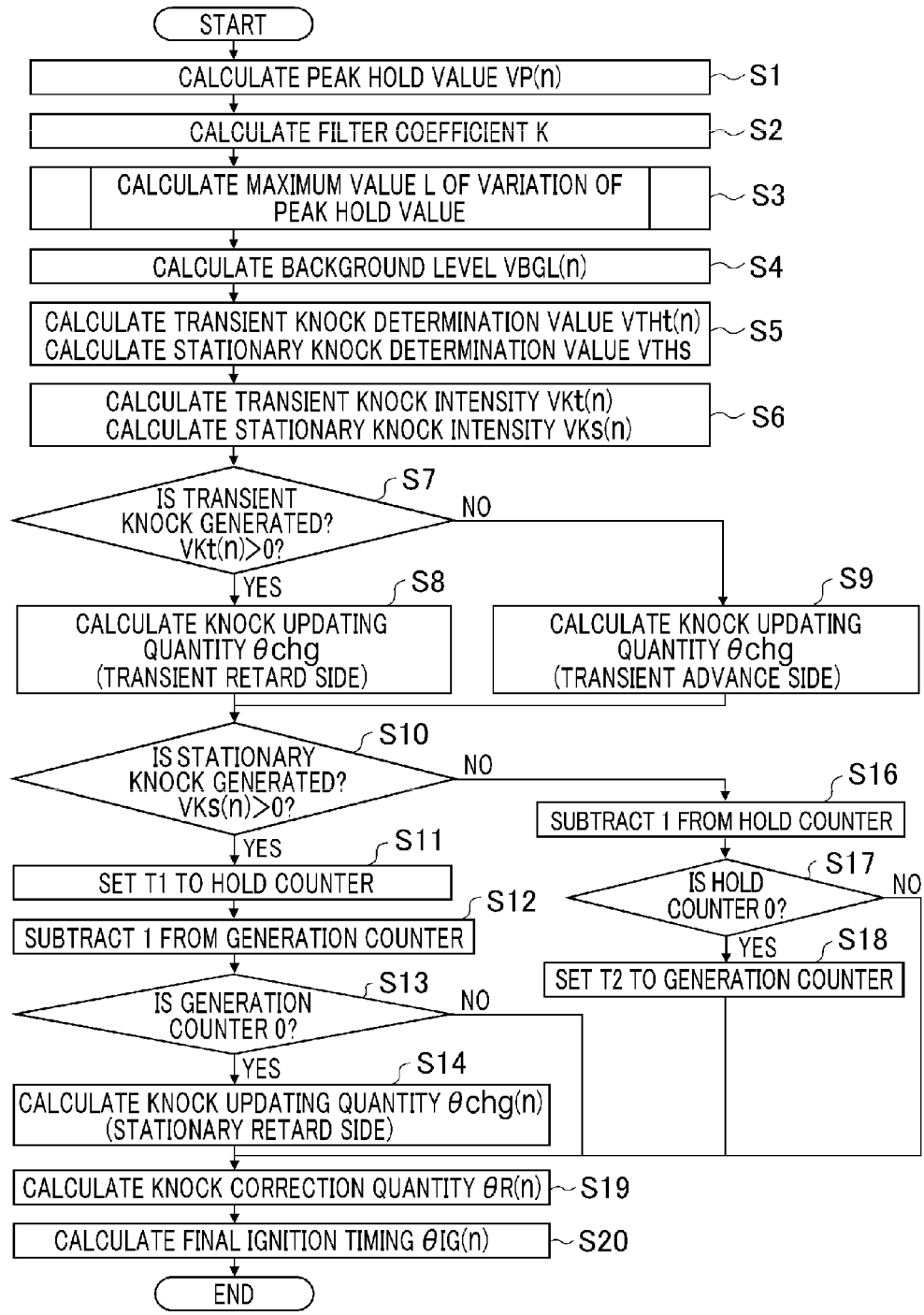
FIG. 15 is a flowchart of a knock control unit of a knock control device of an internal combustion engine according to Embodiment 3 of the present invention.

FIG. 15 is a flowchart of the knock control unit in the knock control device of the internal combustion engine according to Embodiment 3 of the present invention. This drawing corresponds to FIG. 10 in Embodiment 1. The same step numbers shown in FIG. 15 and FIG. 10 denote the same processings. Different processing will be described from step 10.

The stationary knock intensity VKs(n) calculated by the aforementioned step S6 is compared to zero in step S10. If the stationary knock intensity VKs(n) is larger than zero (VKs(n)>0), the processing is advanced to step S11; and if other than that (VKs(n)≤0), the processing is advanced to step S16.

The hold counter is set to T1 in step S11. Then, in subsequent step S12, one is subtracted from the generation counter. The lower limit is limited by zero so as not to be negative. (Although not specified hereinafter, the lower limit is limited by zero in the subtraction processing of the counter.)

A determination is made as to whether or not the generation counter is zero in step S13; if the generation counter is zero, the processing is advanced to step S14; and if other than zero, the processing is advanced to step S19. Step S19 is the same processing as that of FIG. 10.

Updating quantity θchg is regarded as (θchg−θrtds) in step S14. Step S14 is the same processing as step S14 of FIG. 10; and subsequent processing of step S19 is the same as that of FIG. 10.

When the processing is advanced from step S10 to step S16, one is subtracted from the hold counter in step S16.

A determination is made as to whether or not the hold counter is zero in step S17; if the hold counter is zero, the processing is advanced to step S18; and if other than zero, the processing is advanced to step S19.

The generation counter is set to T2 in step S18 and the processing is advanced to step S19.

Figure 16:
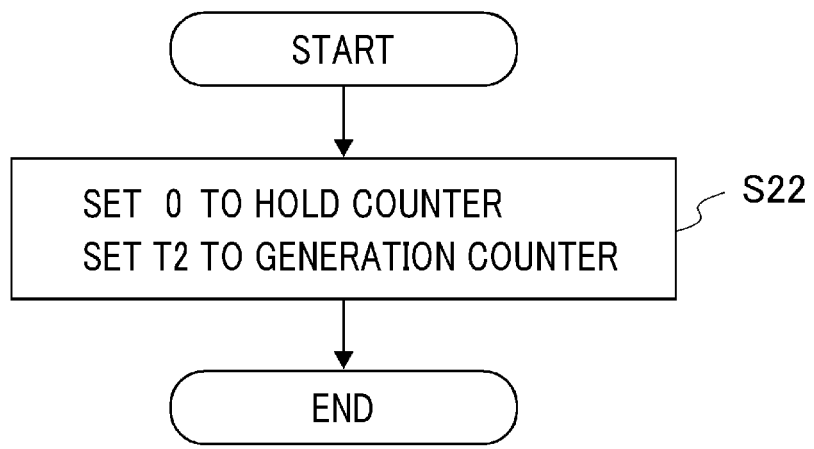
FIG. 16 is a flowchart of initialization of the knock control unit of the knock control device of the internal combustion engine according to Embodiment 3 of the present invention.

FIG. 16 is a flowchart of initialization of the knock control unit in the knock control device of the internal combustion engine according to Embodiment 3 of the present invention. This processing is performed only at the first time when power supply is applied to a microcomputer 16. Initial values of two counters are set in step S22, that is, the hold counter is set to zero and the generation counter is set to T2; and the processing is completed.

As described above, according to Embodiment 3 of the present invention, the knock is not detected by one comparison, but detected by a plurality of comparisons. Therefore, ignition timing is not retarded by a single knock, but the ignition timing can be retarded by only the case where the knock is continuously generated, such as the continuous knock generation state. That is, the possibility of an erroneous determination of knock can be reduced. In addition, a period necessary for detecting a knock is smaller than a minimum value of a period at which the internal combustion engine can allow continuous knock generation; and therefore, even if the knock is continuously generated, the knock can be detected and the ignition timing can be retarded before damaging on the internal combustion engine.

Incidentally, for the sake of simplicity of description, the above description has been made that the maximum value L of the variation of the peak hold value is the value of P shown in FIG. 5; however, the maximum value L is generally set to a value slightly larger than P by providing an appropriate margin.

Various modifications and alternations of this invention will be apparent to those skilled in the art without departing from the scope and spirit of this invention, and it should be understood that this is not limited to the illustrative embodiments set forth herein.

What is claimed is:

1. A knock control device of an internal combustion engine, comprising:
a knock sensor which sends an a vibration waveform signal based on the vibration of said internal combustion engine; and
a control unit which updates a background level based on an output signal from said knock sensor, and detects the generation of a knock by comparing a variation of the background level with a knock determination value,
wherein, in said control unit,
the background level is calculated by primary filter calculation of the output signal from said knock sensor, and
when the background level is calculated by ((current background level)=(filter coefficient)×(previous background level)+(1−filter coefficient)×(output signal from knock sensor)), ((1−filter coefficient)/(1+filter coefficient)×(value not lower than maximum value of variation of output signal from knock sensor in case where knock is not generated))

is regarded as the knock determination value.

2. The knock control device of the internal combustion engine according to claim 1,
wherein the maximum value of the variation of the output signal from said knock sensor in the case where the knock is not generated is set depending on the engine speed of said internal combustion engine.

3. The knock control device of the internal combustion engine according to claim 1,
wherein, in said control unit, a case where a detection of the generation of the knock in the comparison of the variation of the background level with the knock determination value is established predetermined times within a predetermined time is regarded as the detection of the generation of the knock, and the predetermined time is not higher than a minimum value of a time that can allow continuous knock generation.

4. The knock control device of the internal combustion engine according to claim 1,
wherein the output signal from said knock sensor is a peak hold value of the output signal from said knock sensor.

* * * * *